United States Patent
Kang

(10) Patent No.: US 8,314,510 B2
(45) Date of Patent: Nov. 20, 2012

(54) METHOD FOR SELECTING AN ELECTRIC POWER SUPPLY, A CIRCUIT AND AN APPARATUS THEREOF

(75) Inventor: Ho-woong Kang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 445 days.

(21) Appl. No.: 12/204,200

(22) Filed: Sep. 4, 2008

(65) Prior Publication Data

US 2010/0052420 A1     Mar. 4, 2010

(51) Int. Cl.
*H02J 3/14* (2006.01)
*H02J 7/34* (2006.01)

(52) U.S. Cl. .......................................... 307/31; 307/52
(58) Field of Classification Search .................. 307/52, 307/31, 307, 10.1
See application file for complete search history.

(56) References Cited

U.S. PATENT DOCUMENTS

| | | | |
|---|---|---|---|
| 6,316,844 B1 * | 11/2001 | Arima | 307/65 |
| 6,770,984 B2 * | 8/2004 | Pai et al. | 307/46 |
| 7,582,987 B2 * | 9/2009 | Kuo | 307/66 |
| 2005/0206241 A1 * | 9/2005 | Saxena et al. | 307/66 |

FOREIGN PATENT DOCUMENTS

| | | |
|---|---|---|
| JP | 2003032399 A | 1/2003 |
| KR | 1019990021039 A | 3/1999 |

* cited by examiner

*Primary Examiner* — Michael Rutland Wallis
(74) *Attorney, Agent, or Firm* — Sughrue Mion, PLLC

(57) ABSTRACT

A method for selecting an electric power supply and a circuit thereof are provided. The method includes detecting whether there is an output signal from a high electric power source, connecting a low electric power source with input of a transformer if there is no output signal from the high electric power source, disconnecting output of the transformer with a general circuit if there is no output signal from the high electric power source, transforming a voltage received from the low electric power source, and outputting the transformed voltage to a control unit. By disconnecting the output of the transformer with the general circuit, the low power source may reduce waste of an electric power.

20 Claims, 8 Drawing Sheets

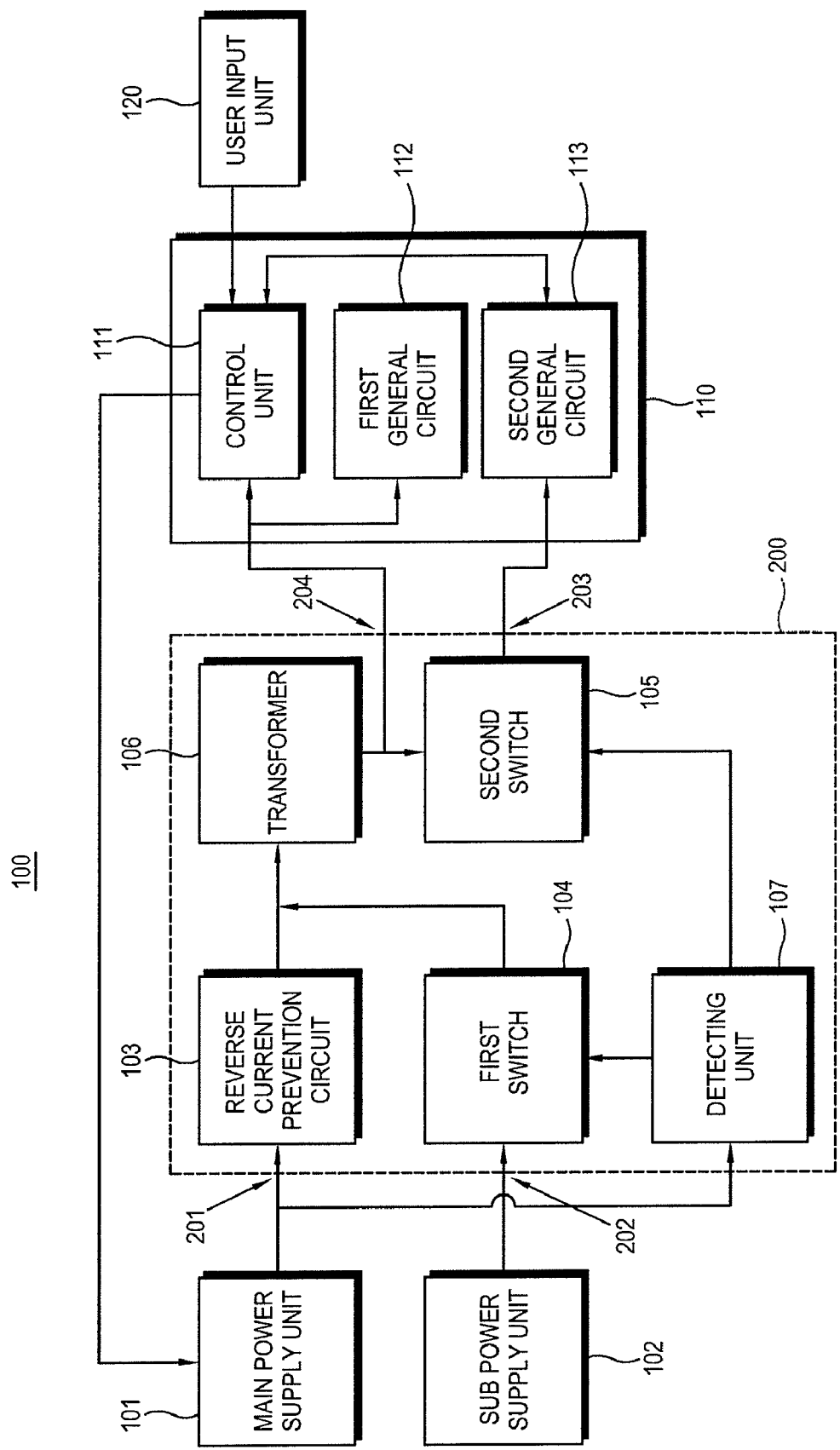

METHOD FOR SELECTING AN ELECTRIC POWER SUPPLY, A CIRCUIT AND AN APPARATUS THEREOF

BACKGROUND OF THE INVENTION

1. Field of the Invention

Methods and apparatuses consistent with the present invention relate to a method for selecting an electric power supply, a circuit and an apparatus thereof, and more particularly to a method for selecting an electric power supply by connecting or disconnecting switches and a display apparatus thereof.

2. Description of the Related Art

In a standby mode, which is a turn off status or not-in-use status when the apparatus is turned on, if the same amount of power is supplied as in-use status, power is wasted. So conventional apparatus uses a main power supply which supplies a high electric power and a sub power supply which supplies a low electric power like FIG. 1.

FIG. 1 illustrates a block diagram of a conventional apparatus 1 having electric power supplies. The conventional apparatus 1 includes a main power supply unit 10, a sub power supply unit 20, and a circuit unit 30 which includes a general circuit unit 31 and a control unit 32.

According to a tendency of integration, it is hard for the sub power supply unit 20 to supply an electric power only to the control unit 32. A part of general circuit unit 31 which is a set of circuits except the control unit 32 also is supplied with an electric power from the sub power supply unit 20 in the standby mode. It causes waste of an electric power.

In a general mode which is the in-use status, the sub power supply unit 20 also supplies an electric power to both the general circuit unit 31 and the control unit 32. It causes overload to the sub power supply unit 20.

A transformer which changes a voltage is used in many apparatus nowadays. The cost of the transformer is high and the size of the transformer is large. So it is desirable to use one transformer instead of two transformers.

SUMMARY OF THE INVENTION

An aspect of the present invention is to provide a method for selecting an electric power supply, a circuit and an apparatus thereof to reduce waste of an electric power and overload.

Another aspect of the present invention is to provide a method for selecting an electric power supply, a circuit and an apparatus thereof to save cost and space.

According to an aspect of the invention, there is provided a circuit for selecting an electric power supply comprising a first input terminal which is operable to be connected with an external low electric power supplier, a transformer which changes a voltage, a first switch which connects or disconnects the first input terminal with input of the transformer, a second input terminal which is operable to connect an external high electric power supply with the input of the transformer, a first output terminal which is operable to connect output of the transformer with a first external circuit, a second output terminal which is operable to be connected with a second external circuit, a second switch which connects or disconnects the output of the transformer with the second output terminal, and a detecting unit which detects whether there is an input signal in the second input terminal and connects or disconnects the first and the second switches according to the result of detection. The detecting unit may connect the first switch and disconnects the second switch if there is no input signal in the second input terminal, and disconnects the first switch and connects the second switch if there is an input signal in the second input terminal.

The circuit may further comprise a reverse current prevention circuit which is located between the second input terminal and the transformer, and prevents a current from flowing to the second input terminal. The reverse current prevention circuit may comprise a diode or a Field-effect transistor. The first switch and the second switch may comprise Field-effect transistors. The transformer may comprise an operational amplifier, a Field-effect transistor, and a capacitor.

According to an aspect of the invention, there is provided an apparatus having electric supplies comprising a high electric supply unit, a low electric supply unit, a transformer which is connected with the high electric supply unit and changes a voltage, a first switch which connects or disconnects the low electric supply unit with input of the transformer, a control unit which is connected to the output of the transformer, and sends a control signal for turning on or off to the high electric supply unit, a first general circuit which is connected to the output of the transformer, a second general circuit, a second switch which connects or disconnects the output of the transformer with the second general circuit, and a detecting unit which detects whether there is an output signal of the high electric supply unit and connects or disconnects the first and the second switches according to the result of detection. The detecting unit may connect the first switch and disconnects the second switch if there is no output signal of the high electric supply unit, and disconnects the first switch and connects the second switch if there is an output signal of the high electric supply unit.

The apparatus may further comprise a reverse current prevention circuit which is located between the high electric supply unit and the transformer, and prevents a current from flowing to the high electric supply unit. The reverse current prevention circuit may comprise a diode or a Field-effect transistor. The first switch and the second switch may comprise Field-effect transistors. The transformer may comprise an operational amplifier, a Field-effect transistor, and a capacitor. The apparatus may further comprise a user input unit which receives a user command for turning on or off the apparatus. The control unit may send the control signal for turning off to the high electric supply unit if the second general circuit is not used for a predetermined time or if the control unit receives the user command for turning off the apparatus from the user input unit, and otherwise sends the control signal for turning on to the high electric supply unit.

According to an aspect of the invention, there is provided a method for supplying an electric power comprising sending a control signal for turning on or off to a high electric power source, detecting whether there is an output signal of the high electric power source, connecting or disconnecting a low electric power source with input of a transformer and output of the transformer with a general circuit according to the result of detection, transforming a voltage in the transformer, and outputting the transformed voltage to a control unit. The sending the control signal may comprise sending the control signal for turning off if the general circuit is not used for a predetermined time or if the control unit receives the user command for turning off the apparatus. The connecting or disconnecting comprises connecting the low electric power source with the input of the transformer if there is no output signal from the high electric power source, and disconnecting the output of the transformer with the general circuit if there is no output signal from the high electric power source. The connecting or disconnecting may comprise disconnecting the low electric power source with the input of the transformer if there is an output signal from the high electric power source and connecting the output of the transformer with the general circuit if there is an output signal from the high electric power source, and further may comprise outputting the transformed voltage to the general circuit if there is an output signal from the high electric power source.

According to an aspect of the invention, there is provided a method for selecting an electric power supply comprising detecting whether there is an output signal from a high electric power source, connecting a low electric power source with input of a transformer if there is no output signal from the high electric power source, disconnecting output of the transformer with a general circuit if there is no output signal from the high electric power source, transforming a voltage received from the low electric power source, and outputting the transformed voltage to a control unit.

According to an aspect of the invention, there is provided a method for selecting an electric power supply comprising detecting whether there is an output signal from a high electric power source, disconnecting a low electric power source with a transformer if there is an output signal from the high electric power source, connecting the transformer with a general circuit if there is an output signal from the high electric power source, transforming a voltage received from the high electric power source, and outputting the transformed voltage to a control unit and the general circuit if there is an output signal from the high electric power source.

BRIEF DESCRIPTION OF THE DRAWINGS

The above and other aspects and features of the present invention will be apparent from the following detailed description of exemplary embodiments taken in conjunction with the accompanying drawings, in which:

FIG. 4B illustrates which parts of the apparatus in FIG. 2 match respective terminals of a power supply selecting chip in FIG. 4A according to an exemplary embodiment of the present invention;

DETAILED DESCRIPTION OF EXEMPLARY
EMBODIMENTS OF THE INVENTION

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are merely specific details provided to assist those of ordinary skill in the art in a comprehensive understanding of the invention, and the present invention is only defined within the scope of the appended claims.

Figure 1:
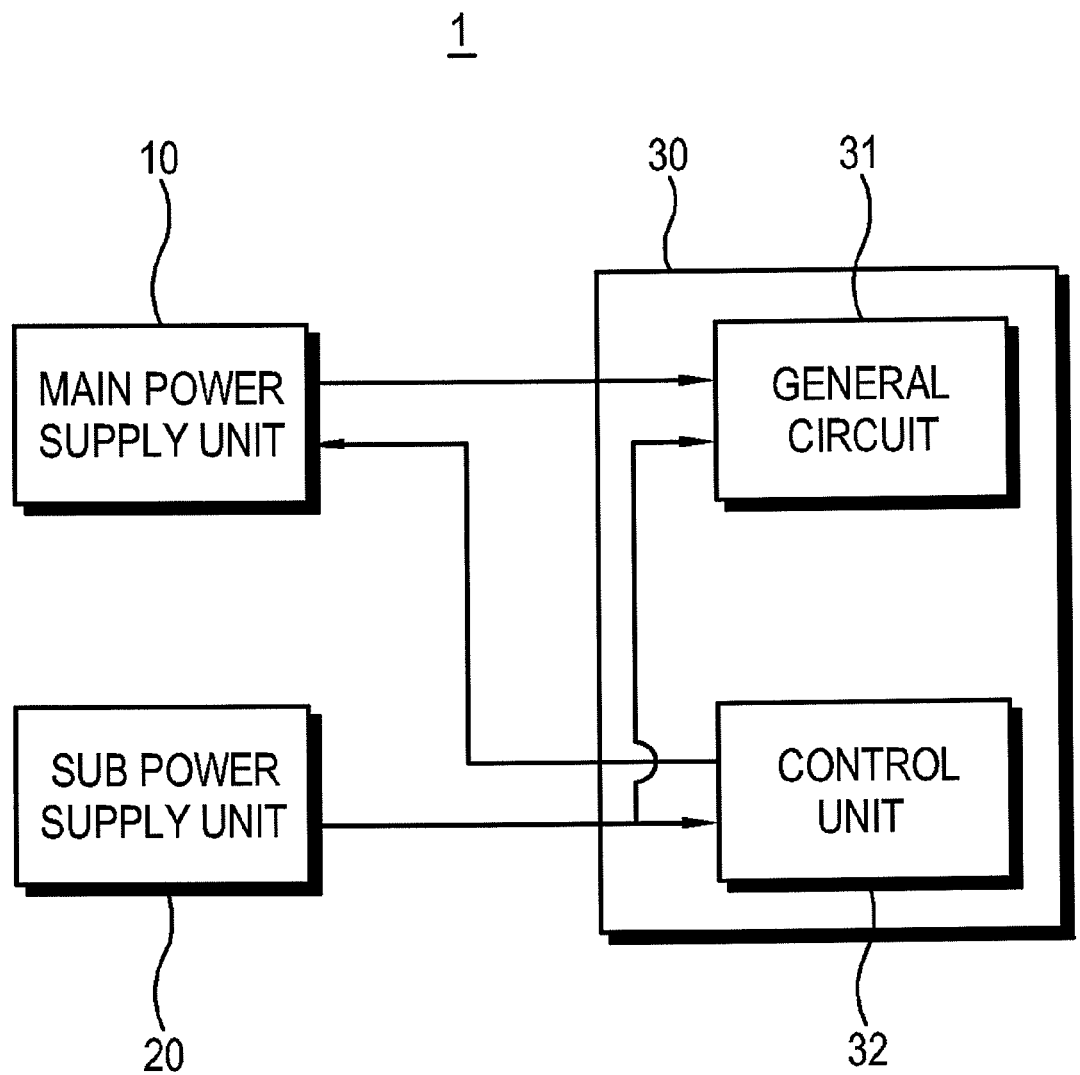
FIG. 1 illustrates a block diagram of a conventional apparatus having electric power supplies.
Figure 2:
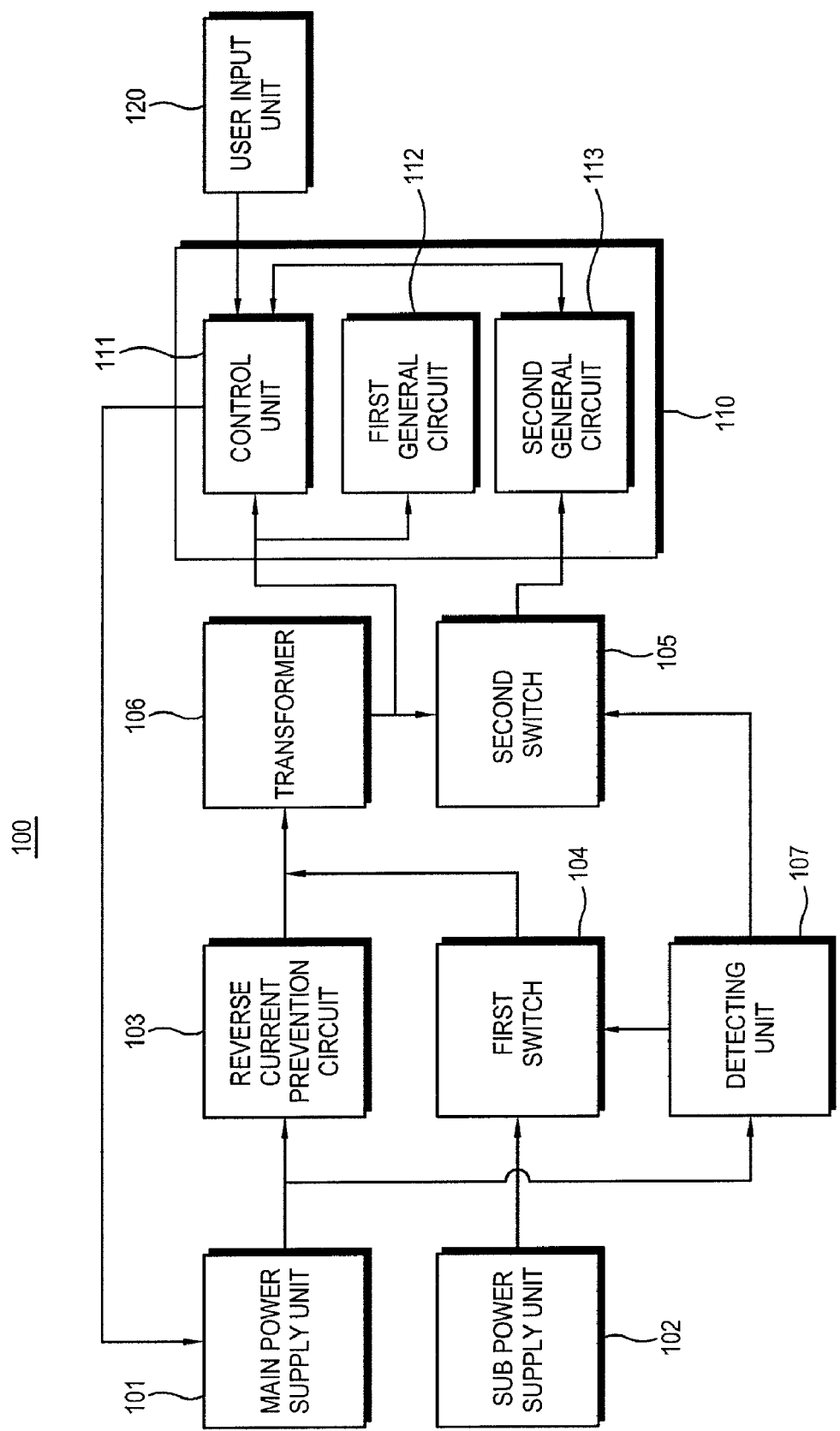
FIG. 2 illustrates a block diagram of an apparatus having power supplies according to an exemplary embodiment of the present invention.

FIG. 2 illustrates a block diagram of an apparatus 100 having power supplies according to an exemplary embodiment of the present invention. Referring to FIG. 2, the apparatus 100 may include a main power supply unit 101, a sub power supply unit 102, a reverse current prevention circuit 103, a first switch 104, a second switch 105, a transformer 106, a detecting unit 107, a circuit unit 110, and a user input unit 120. The circuit unit 100 may include a control unit 111, a first general circuit 112, and a second general circuit 113.

Output terminal of the main power supply unit 101 is connected to the reverse current prevention circuit 103, the detecting unit 107, and the control unit 111. The main power supply unit 101 receives a control signal for turning on or off from the control unit 111 and supplies high electric power to the circuit unit 110 through the reverse current prevention circuit 103.

The sub power supply unit 102 supplies low electric power to the circuit unit 110 through the first switch 104.

The reverse current prevention circuit 103 is connected to the main power supply unit 101 and transmits the high electric power received from the main power supply unit 101 to the transformer 106. Output terminal of the reverse current prevention circuit 103 is connected to output terminal of the first switch 104. The reverse current prevention circuit 103 prevents a current supplied from the sub power supply unit 102 from flowing to the main power supply unit 101, if the mode is the standby mode.

The first switch 104 connects the sub power supply unit 102 with the transformer 106 if the mode is the standby mode, and disconnects the sub power supply unit 102 from the transformer 106 if the mode is the general mode. The first switch 104 receives a control signal for connecting or disconnecting from the detecting unit 107.

The second switch 105 connects the transformer 106 with the second general circuit 113 if the mode is the general mode, and disconnects the transformer 106 from the second general circuit 113 if the mode is the standby mode. The second switch 105 receives a control signal for connecting or disconnecting from the detecting unit 107.

The transformer 106 changes an input voltage of the transformer 106 and outputs the changed voltage to the second switch 105 and the circuit unit 110.

The detecting unit 107 detects whether there is an output signal from the main power supply unit 101. If there is an output signal from the main power supply unit 101, the detecting unit 107 sends a control signal for disconnecting the first switch 104 and a control signal for connecting the second switch 105. If there is no output signal from the main power supply unit 101, the detecting unit 107 sends a control signal for connecting the first switch 104 and a control signal for disconnecting the second switch 105.

The control unit 111 determines whether the mode is the general mode or the standby mode. The control unit 111 sends a control signal for turning on the main power supply unit 101 if the mode is the general mode and sends a control signal for turning off the main power supply unit 101 if the mode is the standby mode. The control unit 111 determines the mode as the standby mode if the second general circuit 113 is not used for a predetermined time or if the control unit 111 receives a turn-off signal from the user input unit 120. Otherwise, the control unit 111 determines the mode as the general mode. The control unit 111 is supplied an electric power from the main power supply unit 101 or the sub power supply unit 102 through the transformer 106.

The first general circuit 112 performs some functions of the apparatus 100 both in the standby mode and the general mode. The first general circuit 112 is supplied an electric power from the main power supply unit 101 or the sub power supply unit 102 through the transformer 106.

The second general circuit 113 performs the other functions of the apparatus 100 in the general mode. The second general circuit 113 is supplies an electric power from the main power supply unit 101 through the second switch 105. The control unit 111 detects whether the second general circuit 113 is not used for a predetermined time.

The user input unit 120 receives a user command for controlling the apparatus 100. A keyboard, a remote controller, a set of buttons, and a touch screen are examples of the user input unit 120. A user may input a turn-off command or a turn-on command through the user input unit 120.

Figure 3A:
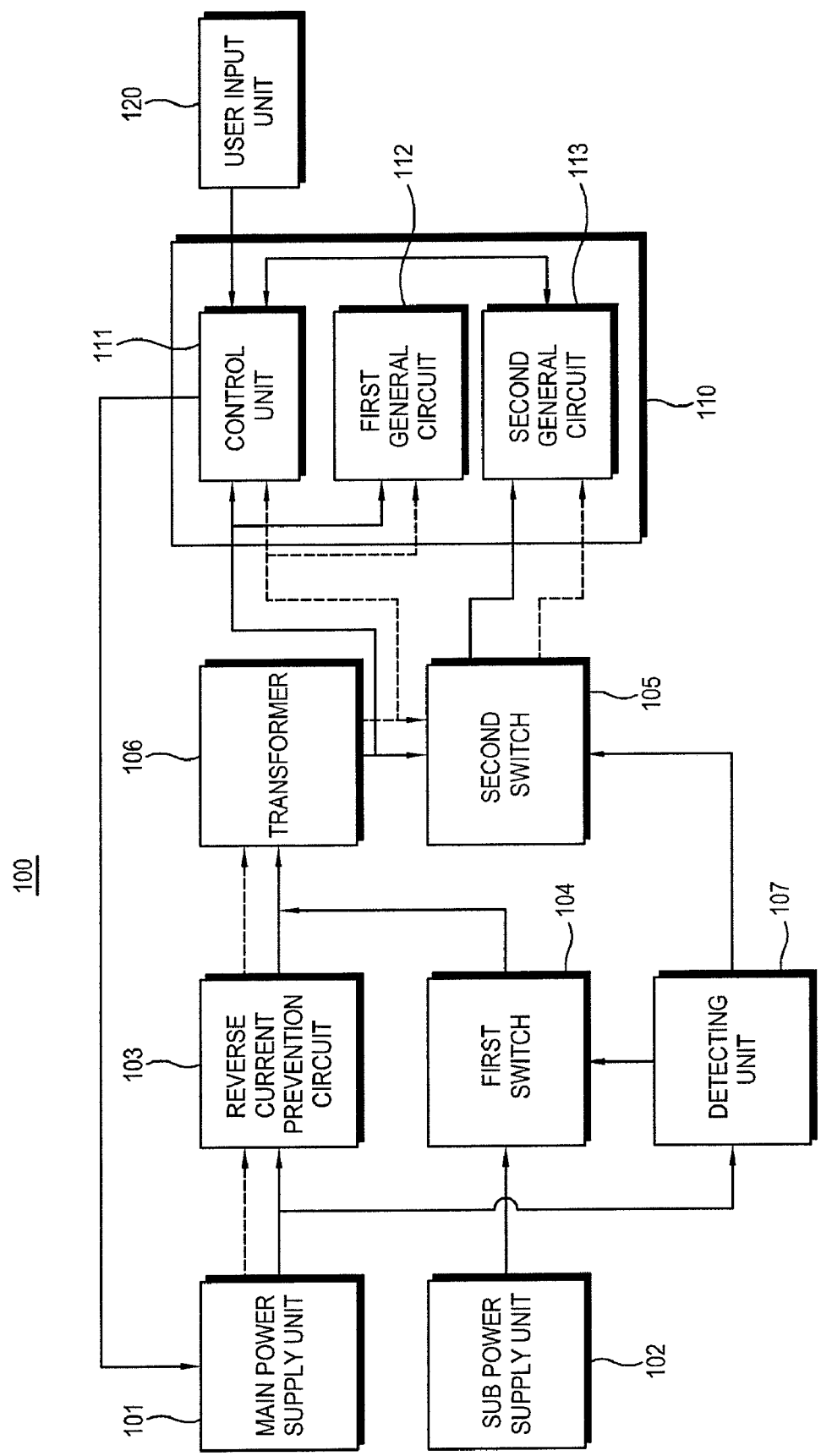
FIG. 3A illustrates an electric power flow in a general mode according to an exemplary embodiment of the present invention.

FIG. 3A illustrates an electric power flow in the general mode according to an exemplary embodiment of the present invention.

In the general mode, the control unit 111 turns on the main power supply unit 101. If the detecting unit 107 detects the output signal from the main power supply unit 101, the detecting unit 107 disconnects the first switch 104 and connects the second switch 105. The control unit 111 and the first general circuit 112 are supplied electric powers from the main power supply unit 101 through the reverse current prevention circuit 103 and the transformer 106. The second general circuit 113 is supplied an electric power from the main power supply unit 101 through the reverse current prevention circuit 103, the transformer 106, and the second switch 105.

Figure 3B:
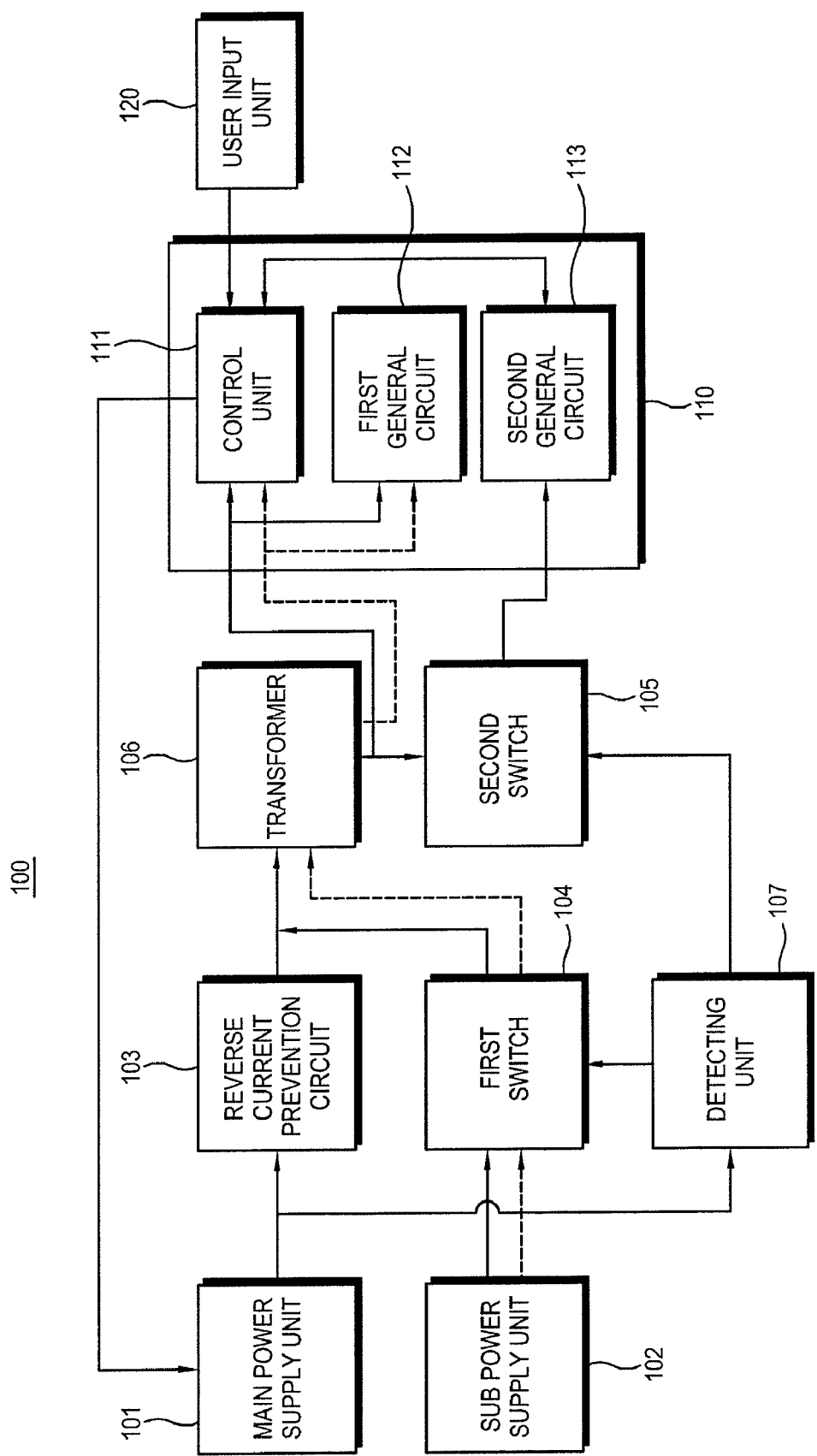
FIG. 3B illustrates an electric power flow in a standby mode according to an exemplary embodiment of the present invention.

FIG. 3B illustrates an electric power flow in the standby mode according to an exemplary embodiment of the present invention.

In the standby mode, the control unit 111 turns off the main power supply unit 101. If the detecting unit 107 detects no output signal from the main power supply unit 101, the detecting unit 107 connects the first switch 104 and disconnects the second switch 105. The control unit 111 and the first general circuit 112 are supplied electric powers from the sub power supply unit 102 through the first switch 104 and the transformer 106. The second general circuit 113 is not supplied any electric power from the main power supply unit 101 or the sub power supply unit 102.

The control unit 111 and the first general circuit 112 are supplied electric powers both in the general mode and the standby mode. The second general circuit 113 is supplied an electric power in the general mode.

In the general mode according to the exemplary embodiment of the present invention, the sub power supply unit 102 is disconnected. So, the sub power supply unit 102 may avoid overload.

In the standby mode according to the exemplary embodiment of the present invention, the sub power supply unit 102 does not supply an electric power to the second general circuit 112. So, the sub power supply unit 102 may reduce waste of an electric power.

Figure 4A:
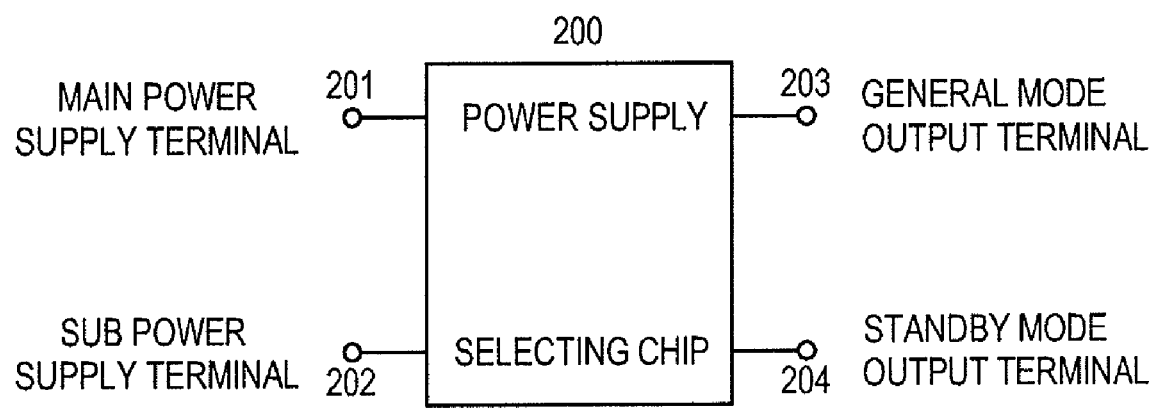
FIG. 4A illustrates a power supply selecting chip according to an exemplary embodiment of the present invention.

FIG. 4A illustrates a power supply selecting chip 200 according to an exemplary embodiment of the present invention.

The power supply selecting chip 200 is a chip comprising circuits and units for switching the power supply units among the circuits and units of the apparatus 100. The power supply selecting chip 200 has two input terminals which are a main power supply terminal 201 and a sub power supply terminal 202. The power supply selecting chip 200 has two output terminals which are a general mode output terminal 203 and a standby mode output terminal 204. The main power supply terminal 201 may be connected to the main power supply unit 101. The sub power supply terminal 202 may be connected to the sub power supply unit 102. In the general mode, both the general mode output terminal 203 and the standby mode output terminal 204 outputs electric powers to the connected circuits. In the standby mode, the standby mode output terminal 204 outputs electric powers to the connected circuits.

FIG. 4B illustrates which parts of the apparatus 100 match respective terminals of the power supply selecting chip 200 according to an exemplary embodiment of the present invention.

The main power supply terminal 201 corresponds to the input line of the reverse current prevention circuit 103. The sub power supply terminal 202 corresponds to the input line of the first switch 104. The general mode output terminal 203 corresponds to the output line of the second switch 105. The standby mode output terminal 204 corresponds to the output line of the transformer 106.

The reverse current prevention circuit 103, the first switch 104, the second switch 105, the transformer 106, and the detecting unit 107 may be included in the power supply selecting chip 200.

Figure 5:
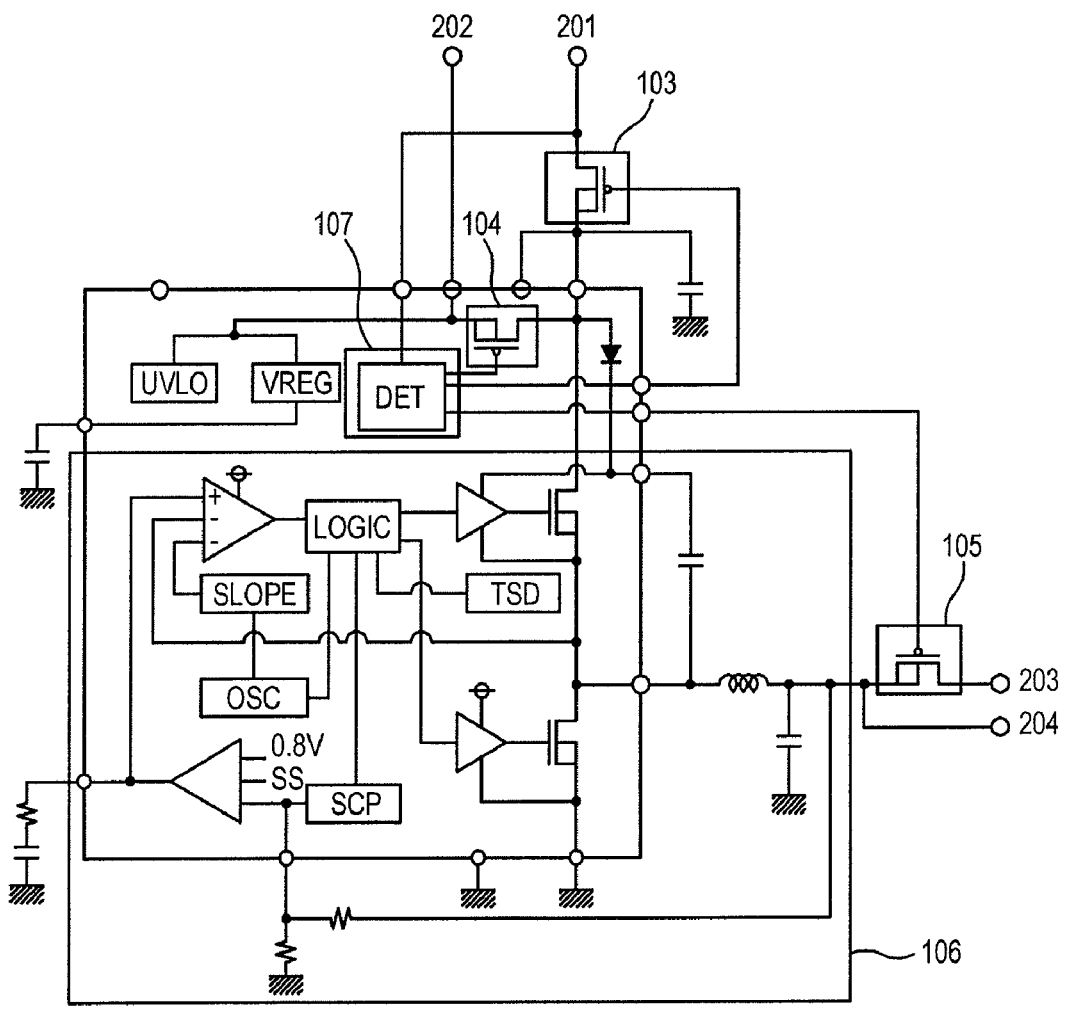
FIG. 5 illustrates detailed circuits of a power supply selecting chip according to an exemplary embodiment of the present invention.

FIG. 5 illustrates detailed circuits of the power supply selecting chip 200 according to an exemplary embodiment of the present invention.

The reverse current prevention circuit 103 may be implemented by a Field-effect transistor (FET). The reverse current prevention circuit 103 also may be implemented by a diode or any kind of switching circuits.

The first switch 104 and the second switch 105 may be implemented by FETs. The first switch 104 and the second switch 105 also may be implemented by any kinds of switching circuits. The transformer 106 may be implemented by operational amplifiers, FETs, capacitors, resistors, a LOGIC which is a circuit for determining whether to operate, a SLOPE which is a sine wave generating circuit, a TSD which is a overheating detection circuit, an OSC which is an oscillator, and a SCP which an overflow preventing circuit. The transformer 106 also may be implemented by a first coil and a second coil. The power supply selecting chip 200 may include a UVLO which is an over voltage preventing circuit and a VREG which is a stabilizing circuit. FIG. 5 further shows the detecting unit 107, and the main power supply terminal 201, the sub power supply terminal 202, the general mode output terminal 203, and the standby mode output terminal 204 illustrated in FIGS. 2 and 4A.

Figure 6:
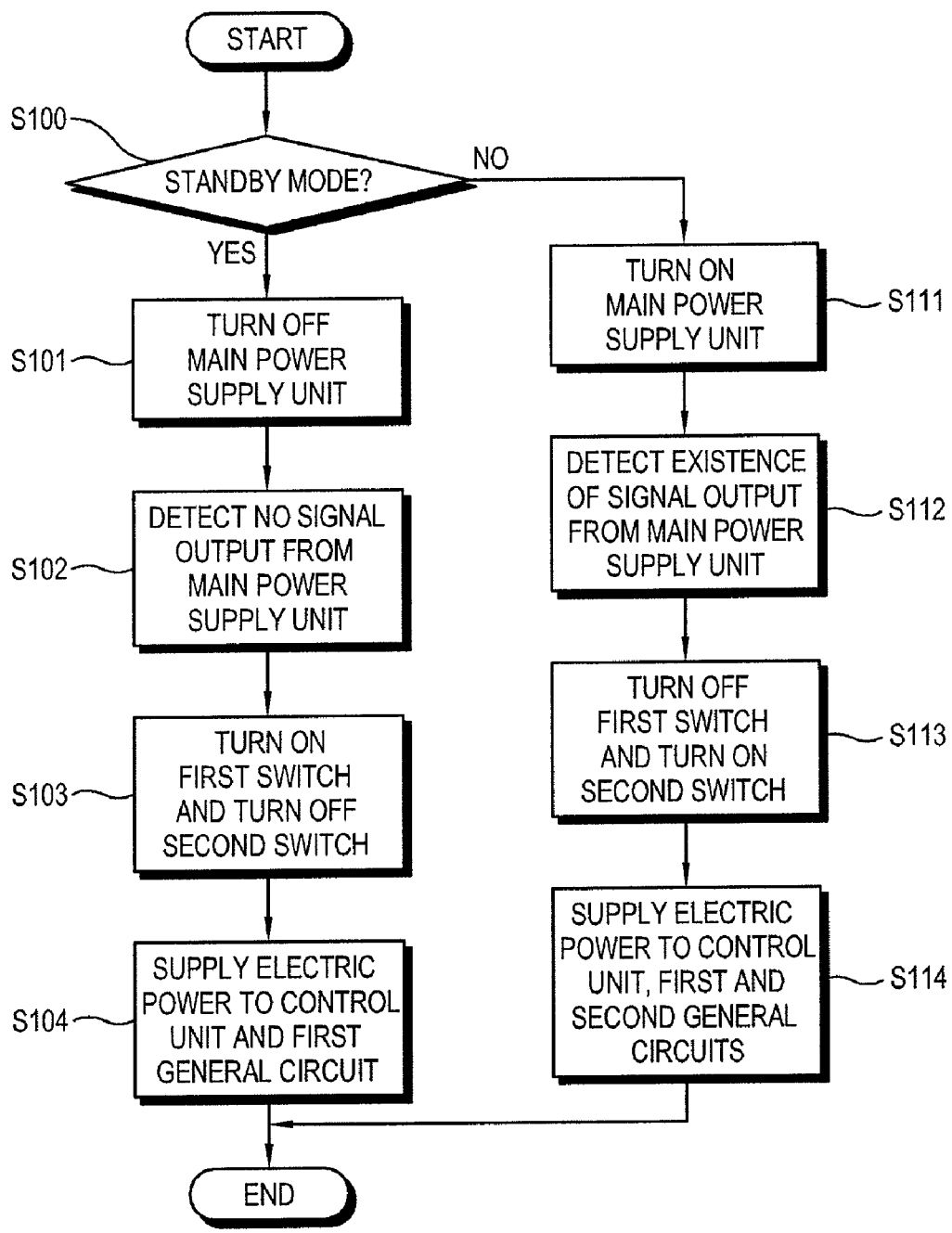
FIG. 6 illustrates a flow chart of operations of an apparatus according to an exemplary embodiment of the present invention.

FIG. 6 illustrates a flow chart of operations of the apparatus 100 according to an exemplary embodiment of the present invention.

The apparatus 100 determines whether the mode is the general mode or the standby mode (S100). The apparatus 100 determines the mode as the standby mode if the second general circuit 113 is not used for a predetermined time or if the control unit 111 receives a turn-off signal from the user input unit 120. Otherwise, The apparatus 100 determines the mode as the general mode. If the apparatus 100 determines the mode as the standby mode (S100-Y), the apparatus 100 turns off the main power supply unit 101 (S101). If the apparatus 100 detects there is no signal output from the main power supply unit 101 (S102), the apparatus 100 turns on the first switch 104 and turns off the second switch 105 (S103). The sub power supply unit 102 supplies electric powers to the control unit 111 and the first general circuit 112 (S104).

If the apparatus 100 determines the mode as the general mode (S100-N), the apparatus 100 turns on the main power supply unit 101 (S111). If the apparatus 100 detects there is a signal output from the main power supply unit 101 (S112), the apparatus 100 turns off the first switch 104 and turns on the second switch 105 (S113). The main power supply unit 101 supplies electric powers to the control unit 111, the first general circuit 112, and the second general circuit 113 (S114).

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A circuit for selecting an electric power supply, comprising:
    a first input terminal which is operable to be connected with an external low electric power supply;
    a transformer which changes a voltage;
    a first switch which connects or disconnects the first input terminal with an input of the transformer;
    a second input terminal which is operable to connect an external high electric power supply with the input of the transformer;
    a first output terminal which is operable to connect an output of the transformer with a first external circuit;
    a second output terminal which is operable to be connected with a second external circuit;
    a second switch which connects or disconnects the output of the transformer with the second output terminal; and
    a detecting unit which detects in a detection, whether there is an input signal in the second input terminal and controls the first and the second switches to connect or to disconnect according to a result of the detection.

2. The circuit of claim 1, wherein the detecting unit controls the first switch to connect and controls the second switch to disconnect if there is no input signal in the second input terminal, and controls the first switch to disconnect and controls the second switch to connect if there is an input signal in the second input terminal.

3. The circuit of claim 1, further comprising a reverse current prevention circuit which is located between the second input terminal and the transformer, and prevents a current from flowing to the second input terminal.

4. The circuit of claim 3, wherein the reverse current prevention circuit comprises a diode or a Field-effect transistor.

5. The circuit of claim 1, wherein the first switch and the second switch comprise Field-effect transistors.

6. The circuit of claim 1, wherein the transformer comprises an operational amplifier, a Field-effect transistor, and a capacitor.

7. An apparatus having electric supplies, comprising:
    a high electric supply unit;
    a low electric supply unit;
    a transformer which is connected with the high electric supply unit and changes a voltage;
    a first switch which connects or disconnects the low electric supply unit with an input of the transformer;
    a control unit which is connected to an output of the transformer, and sends a control signal for turning on or off to the high electric supply unit;
    a first general circuit which is connected to the output of the transformer;
    a second general circuit;
    a second switch which connects or disconnects the output of the transformer with the second general circuit; and
    a detecting unit which detects in a detection, whether there is an output signal of the high electric supply unit and controls the first and the second switches to connect or disconnect according to a result of the detection.

8. The apparatus of claim 7, wherein the detecting unit controls the first switch to connect and controls the second switch to disconnect if there is no output signal of the high electric supply unit, and controls the first switch to disconnect and controls the second switch to connect if there is the output signal of the high electric supply unit.

9. The apparatus of claim 7, further comprising a reverse current prevention circuit which is located between the high electric supply unit and the transformer, and prevents a current from flowing to the high electric supply unit.

10. The apparatus of claim 9, wherein the reverse current prevention circuit comprises a diode or a Field-effect transistor.

11. The apparatus of claim 7, wherein the first switch and the second switch comprise Field-effect transistors.

12. The apparatus of claim 7, wherein the transformer comprises an operational amplifier, a Field-effect transistor, and a capacitor.

13. The apparatus of claim 7, further comprising a user input unit which receives a user command for turning on or off the apparatus.

14. The apparatus of claim 13, wherein the control unit sends the control signal for turning off to the high electric supply unit if the second general circuit is not used for a predetermined time or if the control unit receives the user command for turning off the apparatus from the user input unit, or sends the control signal for turning on to the high electric supply unit.

15. A method for supplying an electric power to an apparatus, the method comprising:
    sending a control signal for turning on or off to a high electric power source;
    detecting in a detection, whether there is an output signal of the high electric power source;
    first connecting and disconnecting a low electric power source with an input of a transformer according to a result of the detection and then connecting and disconnecting an output of the transformer with a general circuit according to the result of the detection;
    transforming a voltage in the transformer; and
    outputting the transformed voltage to a control unit.

16. The method of claim 15, wherein the sending the control signal comprises sending the control signal for turning off if the general circuit is not used for a predetermined time or if the control unit receives a user command for turning off the apparatus.

17. The method of claim 15, wherein the connecting and disconnecting comprises:
    connecting the low electric power source with the input of the transformer if there is no output signal from the high electric power source; and
    disconnecting the output of the transformer with the general circuit if there is no output signal from the high electric power source.

18. The method of claim 15, wherein the connecting and disconnecting comprises disconnecting the low electric power source with the input of the transformer if there is the output signal from the high electric power source and
    connecting the output of the transformer with the general circuit if there is the output signal from the high electric power source, and further comprising outputting the transformed voltage to the general circuit if there is the output signal from the high electric power source.

19. A method for selecting an electric power supply, the method comprising:
- detecting whether there is an output signal from a high electric power source;
- first connecting and disconnecting a low electric power source with an input of a transformer according to a result of the detection and then connecting and disconnecting an output of the transformer with a general circuit according to the result of the detection;
- connecting the low electric power source with an input of the transformer if there is no output signal from the high electric power source;
- disconnecting the output of the transformer with the general circuit if there is no output signal from the high electric power source;
- transforming a voltage received from the low electric power source; and
- outputting the transformed voltage to a control unit.

20. A method for selecting an electric power supply, the method comprising:
- detecting whether there is an output signal from a high electric power source;
- first connecting and disconnecting a low electric power source with an input of a transformer according to a result of the detection and then connecting and disconnecting an output of the transformer with a general circuit according to the result of the detection;
- disconnecting the low electric power source from a transformer if the output signal from the high electric power source is detected;
- connecting the transformer with the general circuit if the output signal from the high electric power source is detected;
- transforming a voltage received from the high electric power source; and
- outputting the transformed voltage to a control unit and the general circuit if the output signal from the high electric power source is detected.

* * * * *